(12) United States Patent
Karjala et al.

(10) Patent No.: US 10,392,450 B2
(45) Date of Patent: Aug. 27, 2019

(54) PROCESS FOR ADDING A CHAIN SHUTTLING AGENT

(71) Applicant: Dow Global Technologies LLC, Midland, MI (US)

(72) Inventors: Thomas W. Karjala, Lake Jackson, TX (US); Brandon Fails, Lake Jackson, TX (US); Jacob Veldman, Lake Jackson, TX (US); Curvel Hypolite, Rosharon, TX (US); James B. Crim, Lake Jackson, TX (US); Anthony J. Castelluccio, Lake Jackson, TX (US); Ludovicus J C Sluijts, Terneuzen (NL); Pradeep Jain, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 24 days.

(21) Appl. No.: 15/561,723

(22) PCT Filed: Mar. 22, 2016

(86) PCT No.: PCT/US2016/023553
§ 371 (c)(1),
(2) Date: Sep. 26, 2017

(87) PCT Pub. No.: WO2016/154188
PCT Pub. Date: Sep. 29, 2016

(65) Prior Publication Data
US 2018/0086857 A1      Mar. 29, 2018

Related U.S. Application Data

(60) Provisional application No. 62/138,439, filed on Mar. 26, 2015.

(51) Int. Cl.
C08F 2/38        (2006.01)
C08F 2/00        (2006.01)
(Continued)

(52) U.S. Cl.
CPC .............. *C08F 2/38* (2013.01); *C08F 2/001* (2013.01); *C08F 210/16* (2013.01);
(Continued)

(58) Field of Classification Search
None
See application file for complete search history.

(56) References Cited

U.S. PATENT DOCUMENTS 5,977,251 A    11/1999  Kao et al.
6,319,989 B1   11/2001  Anderson et al.
(Continued)

FOREIGN PATENT DOCUMENTS

WO    2007/035485 A1    3/2007
WO    2011/014533 A1    2/2011
(Continued)

OTHER PUBLICATIONS

PCT/US2016/023553, International Search Report dated Oct. 6, 2016.
(Continued)

*Primary Examiner* — Catherine S Branch

(57) ABSTRACT

A process to form a block copolymer comprising two or more regions or segments of differentiated polymer composition or properties, including feeding a first mixture that includes a chain shuttling agent, a solvent, the one or more monomers, and optionally hydrogen into a first reactor or reactor zone, feeding a second mixture that includes at least one olefin polymerization catalyst and at least one cocatalyst into the first reactor or reactor zone, contacting the first mixture and the second mixture under polymerization con-
(Continued)

ditions in the first reactor or reactor zone to form a reaction mixture that is characterized by the formation of polymer chains from the monomers, allowing polymerization to occur in the first reactor or reactor zone and/or a second reactor or reactor zone to form polymer chains that are differentiated from the polymer chains, such that the resultant polymer has two or more chemically or physically distinguishable blocks.

8 Claims, 10 Drawing Sheets

(51) Int. Cl.
C08F 210/16 (2006.01)
C08F 297/08 (2006.01)
C08F 210/06 (2006.01)

(52) U.S. Cl.
CPC ........ *C08F 297/083* (2013.01); *C08F 210/06* (2013.01); *C08F 297/08* (2013.01)

(56) References Cited

U.S. PATENT DOCUMENTS

| 7,915,192 | B2 | 3/2011 | Arriola et al. |
| 7,951,882 | B2 | 5/2011 | Arriola et al. |
| 7,981,992 | B2 | 7/2011 | Arriola et al. |
| 7,989,551 | B2 | 8/2011 | Arriola et al. |
| 8,053,529 | B2 | 11/2011 | Carnahan et al. |
| 8,569,422 | B2 | 10/2013 | Shan et al. |

FOREIGN PATENT DOCUMENTS

| WO | 2011/163187 A1 | 12/2011 | |
| WO | WO-2012155022 A1 * | 11/2012 | .............. C08F 10/00 |

OTHER PUBLICATIONS

PCT/US2016/023553, International Preliminary Report on Patentability dated Oct. 3, 2017.
PCT/US2016/023553, Written Opinion of the International Search Authority dated Oct. 6, 2016.

* cited by examiner

PROCESS FOR ADDING A CHAIN SHUTTLING AGENT

FIELD

Embodiments relate to a process for adding a chain shuttling agent into a reactor or reactor zone, e.g., to a first reactor in a method for preparing olefin block copolymers.

INTRODUCTION

When preparing polymers it is known that reactor fouling may occur during continuous operation. The reactor fouling may adversely affect the efficiency of the manufacturing process and/or properties of the resultant material. As such, frequent cleaning of the reactor is required to address reactor fouling. However, since the cleaning operation necessitates shut down of the reactor, reduction of reactor fouling over a set period of time is sought.

SUMMARY

Embodiments may be realized by providing a process for the polymerization of one or more polymerizable $C_2$ to $C_{10}$ alpha-olefin monomers to form a block copolymer comprising two or more regions or segments of differentiated polymer composition or properties. The process includes (A) feeding a first mixture that includes a chain shuttling agent, a solvent, the one or more $C_2$ to $C_{10}$ alpha olefin polymerizable monomers, and optionally hydrogen into a first reactor or reactor zone; (B) feeding a second mixture that includes at least one olefin polymerization catalyst and at least one cocatalyst into the first reactor or reactor zone, whereas the second mixture is separate from the first mixture prior to entering the first reactor or reactor zone; (C) contacting the first mixture and the second mixture under polymerization conditions in the first reactor or reactor zone to form a reaction mixture that is characterized by the formation of polymer chains from the one or more polymerizable $C_2$ to $C_{10}$ alpha olefin monomers; (D) optionally providing the reaction mixture to a second reactor or reactor zone and optionally adding one or more additional solvents, polymerizable $C_2$ to $C_{10}$ alpha olefin monomers, and/or catalysts; and (E) allowing polymerization to occur in at least one of the first reactor or reactor zone and the second reactor or reactor zone to form polymer chains that are differentiated from the polymer chains formed in (C), such that the resultant polymer molecules comprise two or more chemically or physically distinguishable blocks or segments.

BRIEF DESCRIPTION OF THE DRAWINGS

Features of the embodiments will become more apparent to those of ordinary skill in the art by describing in detail exemplary embodiments thereof with reference to the attached drawings in which.

DETAILED DESCRIPTION

Figure 1:
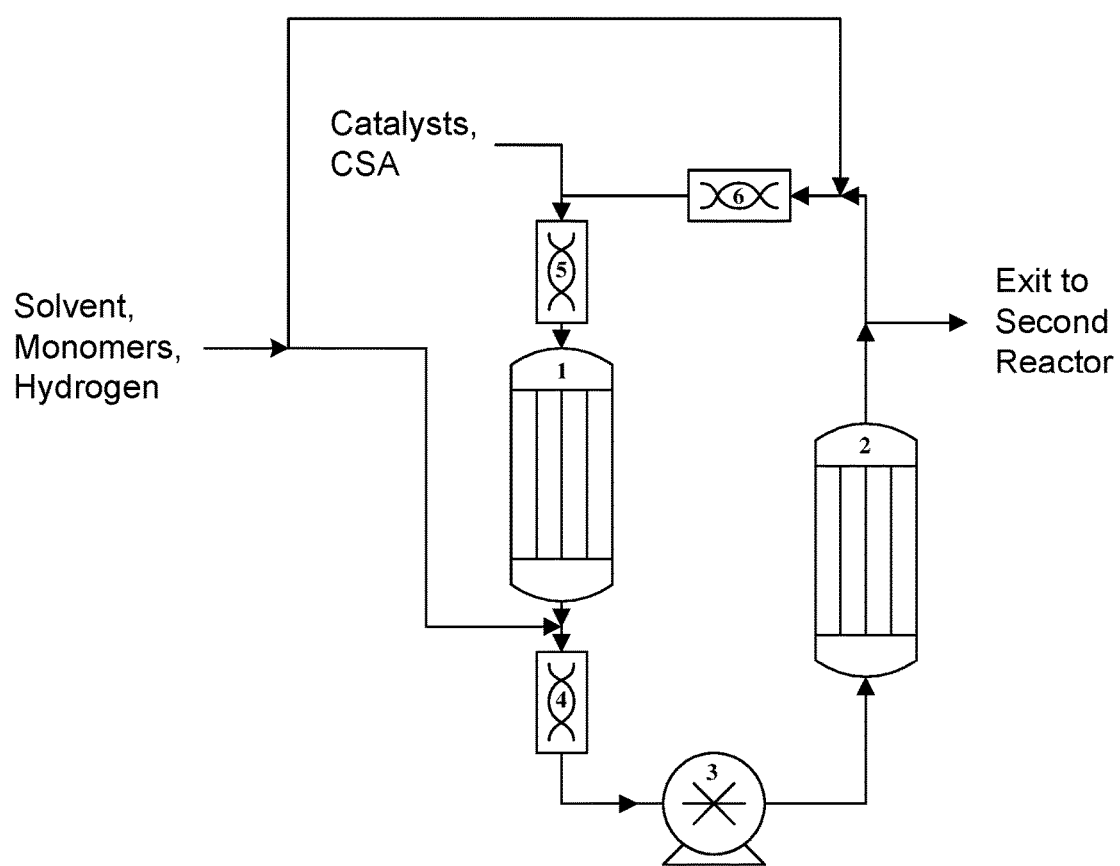
FIG. 1 illustrates a related art configuration of a continuous loop reactor that feeds into a second reactor, in which a chain shuttling agent is introduced into the loop reactor mixed with a low flow rate catalyst feed.

Embodiments relate to a process that utilizes at least one reactor and/or at least one reactor zone, in which a chain shuttling agent is feed into at least a first reactor or reactor zone with a solvent, one or more polymerizable $C_2$ to $C_{10}$ alpha-olefin monomers, and optionally hydrogen, to produce block copolymers comprising two regions or segments of differentiated polymer composition or properties. Optionally, the chain shuttling agent, the solvent, the one or more polymerizable $C_2$ to $C_{10}$ alpha-olefin monomers, and/or the hydrogen are also feed into a second reactor or reactor zone, e.g., in series or in parallel with the feed into the first reactor or reactor zone. The process also includes a separate catalyst feed, which includes at least one olefin polymerization catalyst and at least one cocatalyst, into at least the first reactor or reactor zone. Optionally, at least one catalyst (such as an olefin polymerization catalyst and/or cocatalyst) is also feed into the second reactor or reactor zone, e.g., in series or in parallel with the feed into the first reactor or reactor zone. For example, the mixture including the chain shuttling agent is fed into the first reactor zone or both the first reactor zone and the second reactor zone, in series or parallel, and polymerization is allowed to occur in the either the first reactor zone, or either the first and second reactor zones in parallel.

By chain shuttling agent, it is meant a compound that is capable of preparing the presently identified block copolymers by way of chain shuttling polymerization, in which the chain shuttling agent shuttles polymers chain back and forth from at least a first catalyst (or catalytic site) that propagates a polyolefin chain having a desired property and a second catalyst (or catalytic site), that generates another chain of a different related property. For example, chain shuttling polymerization makes use of at least two different catalysts and the chain shuttling agent (which may include one or more chain shuttling agents) to generate copolymers of alternating crystalline/amorphous properties. The first catalyst (or catalytic site) propagates a polyolefin of a first desired crystalline/amorphous property, e.g., so as to form a crystalline or semi-crystalline block. The second catalyst (or catalytic site) generates another chain of a differing crystalline/amorphous property, e.g., so as to form an amorphous block. Further, it is possible is to use a single catalyst, e.g., in a reactor system having multiple reactors or reaction zones, with different polymerization conditions where portions of each polymer chain can grow in each zone (through chain shuttling) and have different properties.

When referring to the first reactor or reactor zone and the second reactor or reactor zone, by first and second reactors it is meant separate reactors (e.g., connected in series). By first and second reactor zones it is meant two zones (e.g., distinct portions that may optionally have different operating and/or polymerization conditions) of a single reactor. In exemplary embodiments, the block copolymer may be produced using a single reactor and a single reactor zone, using a single reactor and at least two reactor zones therewithin, using at least two reactors that are connected with each other, and/or using any combination thereof. For example, polymerization may occur in the first reactor or reactor zone, in the second reactor or reactor zone, and/or in both the first reactor or reactor zone and the second reactor or reactor zone (so as to occur in at least one of the first reactor or reactor zone and the second reactor or reactor zone).

For example, a process that utilizes a chain shuttling agent to prepare a block or segmented copolymer is discussed in U.S. Pat. No. 7,915,192. An exemplary process includes contacting at least ethylene or propylene under addition polymerization conditions with a composition comprising the admixture or reaction product resulting from combining: (A) a first olefin polymerization catalyst, (B) a second olefin polymerization catalyst (also referred to as a cocatalyst) capable of preparing polymers differing in chemical or physical properties from the polymer prepared by catalyst (A) under equivalent polymerization conditions; and (C) the chain shuttling agent. Whereas, at least one of catalyst (A) and catalyst (B) are capable of forming a branched polymer by means of chain walking or reincorporation of in situ formed olefinic polymer chains.

Block copolymers prepared using chain shuttling polymerization include two or more blocks having the differing related properties. Exemplary, olefin block copolymers prepared via chain shuttling polymerization are available from The Dow Chemical Company in the product families of INFUSE™ and INTUNE™.

With respect to the phrase block copolymers, the reference is to copolymers that comprise sequences ("blocks"), covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply and may optionally further comprise additional blocks of other different types. Multi-block copolymers may be, e.g., linear multi-block, multi-block star polymers (in which all blocks bond to the same atom or chemical moiety), or comb-like polymers where the B blocks are attached at one end to an A backbone. Block copolymers may be created when two or more polymer molecules of different chemical composition are covalently bonded to each other. For example, the blocks may differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, and/or any other chemical or physical property.

Embodiments relate to a specific type of "block copolymer" or "segmented copolymer" produced using chain shuttling polymerization, in which to a polymer comprising two or more chemically distinct regions or segments (referred to as "blocks"). The regions or segments may be joined in a linear manner. For example, the block copolymers may comprise chemically differentiated units that are joined end-to-end with respect to a polymerized functionality (e.g., ethylenic functionality), rather than in pendent or grafted fashion. In embodiments, the block copolymers are characterized by unique distributions of polymer polydispersity (PDI or Mw/Mn), block length distribution, and/or block number distribution, based on the effect of the chain shuttling agent(s) in combination with the catalyst(s). For example, a block composite that includes the block copolymer possess a PDI from 1.7 to 15, from 1.8 to 3.5, from 1.8 to 2.2, and/or from 1.8 to 2.1. The block copolymers of the embodiments may be characterized by the presence of differentiated blocks within the polymer chains, having both crystalline and amorphous nature. Other options include, semi-crystalline and amorphous in nature, crystalline and varied degree of crystallinity in nature, and amorphous and varied degree of amorphous in nature.

Chain shuttling polymerization of block copolymers differ from living polymerization processes that involve only initiation and propagation steps and essentially lack chain terminating side reactions. A polymer created in a "living" system can have a narrow or extremely narrow distribution of molecular weight and be essentially monodisperse (i.e., the molecular weight distribution is essentially one). Living catalyst systems are characterized by an initiation rate, which is on the order of or exceeds the propagation rate, and the absence of termination or transfer reactions.

A process of using the chain shuttling agent includes a first stage of contacting an addition polymerizable monomer or mixture of monomers under addition polymerization conditions in a first reactor or reactor zone with a composition comprising at least one olefin polymerization catalyst and a cocatalyst, and characterized by the formation of polymer chains from said monomer or monomers. The process further includes a second stage of providing and/or transferring the reaction mixture to a second reactor or reactor zone and optionally adding one or more additional reactants, catalysts, monomers or other compounds prior to, commensurate with, or after said providing/transferring. The process also includes a third stage of causing polymerization to occur in said second reactor or reactor zone to form polymer chains that are differentiated from the polymer chains formed form in the first reactor or reactor zone. The process is characterized by addition of the chain shuttling agent to the reaction mixture prior to, during, or subsequent to the first stage such that at least some of the resulting polymer molecules from the third stage comprise two or more chemically or physically distinguishable blocks or segments. For example, the chain shuttling agent is added to the reaction mixture prior to or during the second stage such that at least some of the resulting polymer molecules from the third stage comprise two or more chemically or physically distinguishable blocks or segments. An exemplary process of using the chain shuttling agent is discussed in U.S. Pat. No. 8,053,529.

The chain shuttling polymerization process for forming a block copolymer may utilize one or more reactor zones within a reactor. For example, as discussed in U.S. Pat. No. 7,989,551, a single reactor continuous process may be used for the polymerization of the block copolymer having comprising multiple regions or segments having differentiated polymer compositions or properties. The process includes contacting an addition polymerizable monomer or mixture of monomers under addition polymerization conditions with a composition comprising at least a single olefin polymerization catalyst and a cocatalyst in a first reactor zone, and forming at least some of the growing polymer chains under differentiated process conditions such that two or more blocks or segments formed. At least some of the resulting polymers are chemically or physically distinguishable, such that the differentiated process condition is a monomer gradient maintained between at least two regions of the reactor. For example, a monomer gradient may be formed between the first and second reactor zones.

In embodiments, the process of adding the chain shuttling agent and forming the block copolymers includes feeding a first mixture that includes the chain shuttling agent, the solvent, the one or more $C_2$ to $C_{10}$ alpha olefin polymerizable monomers, and optionally hydrogen into a first reactor or reactor zone. The first mixture may be formed by separate feed streams that are mixed together prior to entering the first reactor or reactor zone. Further, a second mixture that includes at least one olefin polymerization catalyst, at least one cocatalyst, and excludes any chain shuttling agents, is feed into the first reactor or reactor zone. The second mixture may be formed by separate feed streams that enter the first reactor or reactor zone in a similar area (different from where the first mixture enters the first reactor or reactor zone) so as to mix in that similar area or that are mixed together prior to entering the first reactor or reactor zone. The second mixture (and all of the separate streams thereof) is separate from the first mixture prior to entering the first reactor or reactor zone. Optionally, a third mixture that includes at least one cocatalyst may enter the first reactor or reactor zone, in an area different from where the first mixture and the second mixture enter the first reactor or reactor zone.

For example, the process is characterized by addition of the chain shuttling agent only to the first reaction mixture and excluded from the second mixture. The first mixture contacts the second mixture under polymerization conditions in the first reactor or reactor zone to form a reaction mixture that is characterized by the formation of polymer chains from said one or more polymerizable $C_2$ to $C_{10}$ alpha olefin monomers. Thereafter, the reaction mixture is provided to and/or transferred to a second reactor or reactor zone and optionally one or more additional solvents, polymerizable $C_2$ to $C_{10}$ alpha olefin monomers, chain shuttling agent, and/or catalysts (such as the olefin polymerization catalyst and the at least one cocatalyst) are added to the second reactor or reactor zone. In exemplary embodiments, the chain shuttling agent may only be added to the first reactor in the same feed as the monomers, the solvent, and the optionally present hydrogen. This allows for polymerization to occur in the second reactor or reactor zone to form polymer chains that are differentiated from the polymer chains formed in the first reactor or reactor zone, such that the resultant polymer molecules comprise two or more chemically or physically distinguishable blocks or segments.

In exemplary embodiments, the first mixture has a flow rate in pounds per hour into the first reactor or reactor zone that is from 95 times to 1,000,000 times greater than the flow rate in pounds per hour of the second mixture into the first reactor or reactor zone. For example, from 95 to 500,000 times greater, from 95 to 250,000 times greater, and/or from 100 to 200,000 times greater than the flow rate in pounds per hour of the second mixture into the first reactor or reactor zone. In exemplary embodiments, both the first mixture and the second mixture may enter the reactor at ambient conditions. In other exemplary embodiments, the first mixture may be cooled (e.g., to a temperature well below the average reaction temperature within the reactor or reactor zone) prior to entering the reactor such that the chain shuttling agent enters the first reactor or reactor zone at a lower temperature than the components of the second mixture (e.g., at a lower temperature than the at least one olefin polymerization catalyst and the at least one cocatalyst). In other exemplary embodiments, the first mixture may have a temperature that is cooler than the first reactor or reactor zone at the time of entering the first reactor or reactor zone. In such exemplary embodiments, the chain shuttling agent would be allowed to enter the first reactor or reactor zone at a cooler temperature as part of the first mixture as compared to if the chain shuttling agent had been part of the second mixture, e.g., based on the high volume and/or relatively lower temperature, the first mixture may provide improved control with respect to the temperature of the chain shuttling agent when entering the first reactor or reactor zone.

Components

The components used in the chain shuttling polymerization process include the chain shuttling agent (which includes one or more chain shuttling agents), the solvent (which includes one or more solvents), one or more $C_2$ to $C_{10}$ alpha olefin polymerizable monomers, at least one catalyst, at least one cocatalyst, and optionally hydrogen. The chain shuttling polymerization process forms a block copolymer, which may be part of a block composite.

With respect to the process, reactor or reactor zone temperature and/or pressure may be controlled by adjusting the solvent/monomer ratio and/or the catalyst addition rate. The pressure may be optionally be adjusted by controlled with a reactor pressure control valve that is downstream (e.g., in exit piping). In exemplary embodiments, feed temperature and/or coolant temperature in reactor heat exchangers or reactor heating/cooling jacket may be adjusted. In an exemplary process, at least catalysts (A) and (B), the solvent, the monomers, the chain shuttling agent, and optionally hydrogen are continuously or intermittently introduced in the reactor (liquid phase or gas phase) or any recycled portion thereof. The polymerization rate is controlled by the rate of catalyst addition. The comonomer content (if any) of the polymer product is determined by the ratio of major monomer to comonomer in the reactor, which is controlled by manipulating the respective feed rates of these components to the reactor. For example, the monomer is the major component of the one or more polymerizable $C_2$ to $C_{10}$ alpha-olefin monomers and the comonomer is the one or more minority components of the one or more polymerizable $C_2$ to $C_{10}$ alpha-olefin monomers. The molecular weight of the polymer product, may be controlled by controlling other polymerization variables such as the temperature, monomer concentration, and/or the chain shutting agent (e.g., type and/or concentration), as is known in the art. Upon exiting the reactor, the effluent may be contacted with a catalyst kill agent such as water, steam, and/or an alcohol. The polymer solution may be optionally heated, and the polymer product may be recovered by flashing off gaseous monomers and/or residual solvent at reduced pressure. In a continuous process the mean residence time of the catalyst and polymer in the reactor may be from 5 minutes to 8 hours and/or from 10 minutes to 6 hours.

Chain Shuttling Agent

The phrase chain shuttling agent refers to a compound or mixture of compounds employed in the reaction mixture, and feed as part of the first mixture, that is capable of causing polymeryl exchange between at least two active catalyst sites of the catalysts included in the reaction mixture under the conditions of the polymerization (through single or multiple reaction steps). In contrast to a chain shuttling agent, a "chain transfer agent" causes termination of polymer chain growth and amounts to a one-time transfer of growing polymer from the catalyst to the transfer agent. The chain shuttling agent may have an activity ratio $R_{A-B}/R_{B-A}$ of from 0.01 and 100 (e.g., from 0.1 to 10, from 0.5 to 2.0, and/or from 0.8 to 1.2), whereas $R_{A-B}$ is the rate of polymeryl transfer from a first catalyst (Catalyst A) active site to a second catalyst (Catalyst B) active site via the chain shuttling agent. $R_{B-A}$ is the rate of reverse polymeryl transfer, that is, the rate of exchange starting from the Catalyst B active site to the Catalyst A active site via the chain shuttling agent. The intermediate formed between the chain shuttling agent and the polymeryl chain may be sufficiently stable that chain termination is relatively rare.

Exemplary chain shuttling agents for chain shuttling polymerization are discussed in, e.g., U.S. Pat. Nos. 7,951,882 and 7,981,992; and International Publication No. WO/2011/014533. For example, chain shuttling agents for use herein include Group 1, 2, 12 or 13 metal compounds or complexes containing at least one $C_{1-20}$ hydrocarbyl group. For example, hydrocarbyl substituted aluminum, gallium or zinc compounds containing from 1 to 12 carbons in each hydrocarbyl group, and reaction products thereof with a proton source, may be used. The hydrocarbyl groups may be alkyl groups, linear or branched, $C_{2-8}$ alkyl groups. Exemplary chain shuttling agents include trialkyl aluminum and dialkyl zinc compounds, e.g., triethylaluminum, tri(i-propyl) aluminum, tri(i-butyl)aluminum, tri(n-hexyl)aluminum, tri (n-octyl)aluminum, triethylgallium, and diethylzinc. Additional exemplary chain shuttling agents include the reaction product or mixture formed by combining the foregoing organometal compound, e.g., a tri($C_{1-8}$) alkyl aluminum or di($C_{1-8}$) alkyl zinc compound, especially triethylaluminum, tri(i-propyl)aluminum, tri(i-butyl)aluminum, tri(n-hexyl) aluminum, tri(n-octyl)aluminum, or diethylzinc, with less than a stoichiometric quantity (relative to the number of hydrocarbyl groups) of a secondary amine or a hydroxyl compound, especially bis(trimethylsilyl)amine, t-butyl(dimethyl)siloxane, 2-hydroxymethylpyridine, di(n-pentyl) amine, 2,6-di(t-butyl)phenol, ethyl(1-naphthyl)amine, bis(2, 3,6,7-dibenzo-1-azacycloheptaneamine), or 2,6-diphenylphenol. Sufficient amine or hydroxyl reagent may be used such that one hydrocarbyl group remains per metal atom. Of this, exemplary chain shuttling agents are n-octylaluminum di(bis(trimethylsilyl)amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis(di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

In exemplary embodiments, the chain shuttling agent is a trihydrocarbyl aluminum- or dihydrocarbyl zinc-compound containing from 1 to 12 carbons in each hydrocarbyl group. For example, the chain shuttling agent may comprise diethylzinc (DEZ) as the primary component (e.g., in an amount of at least 50 wt %, at least 60 wt %, at least 70 wt %, at least 80 wt %, at least 90 wt %, and/or at least 95 wt %, based on the total weight of chain shuttling agents used in the process).

Catalyst and Cocatalysts

Exemplary catalysts and cocatalysts are discussed in, e.g., U.S. Pat. Nos. 7,951,882 and 7,981,992. The exemplary catalysts include olefin polymerization catalysts. For example, catalysts for use herein include any compound or combination of compounds that is adapted for preparing polymers of the desired composition or type. Heterogeneous and/or homogeneous catalysts may be employed. Examples of heterogeneous catalysts include Ziegler-Natta compositions, e.g., Group 4 metal halides supported on Group 2 metal halides or mixed halides and alkoxides and chromium or vanadium based catalysts. For example, the catalysts for use herein are homogeneous catalysts comprising a relatively pure organometallic compound or metal complex, especially compounds or complexes based on metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25% and/or greater than 10% under the conditions of the chain shuttling polymerization.

Metal complexes for use herein as a first catalyst include complexes of transition metals selected from Groups 3 to 15 of the Periodic Table of the Elements containing one or more delocalized, π-bonded ligands or polyvalent Lewis base ligands. Examples include metallocene, half-metallocene, constrained geometry, and polyvalent pyridylamine, or other polychelating base complexes. The complexes are generically depicted by the formula: $MK_kX_xZ_z$, or a dimer thereof, wherein M is a metal selected from Groups 3-15 (e.g., Groups 3-10, Groups 4-8, and/or Group 4) of the Periodic Table of the Elements;

K independently in each occurrence is a group containing delocalized π-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently in each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently in each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

The mixture catalysts and cocatalysts, that exclude the chain shuttling agent, are continuously or intermittently introduced in the first reactor or reactor zone liquid phase and optionally the second reactor or reactor zone, or any recycled portion thereof.

Monomers

Alpha-olefin monomers for use in preparing the block copolymer include propylene, ethylene, and other $C_{4-10}$ α-olefins, such as 1-butene, 1-pentene, 3--methyl-1-butene, 1-hexene, 4-methyl-1-pentene, 3-methyl-1-pentene, 1-octene, and 1-decene. In exemplary embodiments, the block copolymer is prepared using propylene and ethylene. For example, the block copolymer may be an isotatic polypropylene (iPP) and ethylene propylene (EP) block copolymer, i.e., an iPP-EP block copolymer.

Solvent

The monomers to be polymerized are introduced continuously together with the solvent (also referred to as a diluent) and the chain shuttling agent. The solvent may include one or more solvents. The solvent may be a non-polar solvent or solvent mixture that is capable of dissolving the polymer, and optionally the catalyst components and/or chain shuttling agent. The first mixture feed to the first reactor or reactor zone may include a liquid phase composed (e.g., consisting essentially or consisting) of the monomers together with the solvent, any chain shuttling agent, and dissolved polymer. Exemplary solvents include $C_{4-10}$ hydrocarbons or mixtures thereof, especially alkanes such as hexane or mixtures of alkanes.

Exemplary Processes

In embodiments, when producing block copolymers the chain shuttling agent (such as diethyl zinc—DEZ) is considered a catalyst component, but is fed with non-catalyst components. In particular, the chain shuttling agent is fed with solvent(s), one or more polymerizable $C_2$ to $C_{10}$ alpha-olefin monomers, and optionally hydrogen (in instances where hydrogen is used in the process for forming the block copolymers) as a first mixture. The catalyst feed, which includes at least one polymerization catalyst and at least one cocatalyst, does not include the chain shuttling agent, and is fed as a second mixture that is separate from the first mixture. Further, the circulating reactor contents may be heated (e.g., to a temperature from 100° C. to 160° C.). It is theorized that when the chain shuttling agent is added as part of a lower flow rate catalyst feed, plugging of a second mixture injector (i.e., catalyst feed injector) may occur at least partially based on degradation of the chain shuttling agent such as DEZ when fed to a hot reactor. This may be based on heat transfer from the warm reactor contents to the piping of the second mixture injector assembly causing the temperature of the second mixture to rise above the degradation temperature of CSA. Accordingly, by introducing the DEZ with the higher flow rate first mixture feed and optionally cooled first mixture feed, plugging of the second mixture injector may be reduced and/or minimized. Further, by introducing the DEZ as part of the higher flow rate first mixture feed, the overall feed is less sensitive to heat transfer from the warm reactor contents in the piping of a first mixture injector and the first mixture may optionally be cooled, as such plugging of the first mixture injector may not be significantly impacted by inclusion of the DEZ in the first mixture.

Further, it is believed that because a chain shuttling agent like DEZ is the primary component that regulates molecular weight when producing block copolymers (such a diblock copolymers), that the risk of producing excessively high molecular weight at or near the feed injection to the reactor may be mitigated by placing the chain shuttling agent as dispersed in the higher flow rate feed streams instead of the lower flow rate catalyst systems. Accordingly, by introducing the chain shuttling agent as mixed in a higher flow rate feed stream, plugging of the reactor or reactor zone may be reduced and/or minimized. As such, this reduces reactor fouling and/or the formation of reactor gels that may negatively impact product quality.

An exemplary process for carrying out a chain shuttling polymerization process, in which the chain shuttling agent is feed with the higher flow rate feed streams, utilizes one or more continuously stirred tank or loop reactors operating under solution polymerization conditions. Whereas, the monomers to be polymerized are introduced continuously together with any solvent and the chain shuttling agent at one part of the first reactor or reactor zone. The first reactor or reactor zone contains a relatively homogeneous liquid phase composed substantially of monomers together with any solvent, the chain shuttling agent, and dissolved polymer. Examples loop reactors and operating conditions for use therewith, including the use of multiple loop reactors, operating in series, may be found in U.S. Pat. Nos. 5,977,251; and 6,319,989. Examples of using loop reactors to prepare olefin block copolymers are discussed, e.g., with respect to Examples 5-12 in U.S. Pat. No. 8,569,422, which refer to a method of manufacturing that utilizes two recirculating loop reactors configured in series.

Continuously stirred tank reactors (CSTR) may run at steady state with continuous flow of reactants and products. The feed assumes a uniform composition throughout the reactor such that an exit stream has the same composition as in the tank. Block copolymers may be prepared using two CSTRs connected in series. Each reactor may be hydraulically full and set to operate at steady state conditions. For example, a sample may be prepared by flowing a first feed that includes monomers, solvent, the chain shutting agent, and optional hydrogen and a second feed that includes at least catalyst-1, cocatalyst-1, and excludes the chain shuttling agent into a first reactor according to predetermined process conditions. The resultant samples then flow to a second reactor in series. Additional monomers, solvent, catalyst-1, and/or cocatalyst-1 may be added to the second reactor, along with a small amount of modified methylalumoxane (MMAO) as a scavenger. Varied samples C1 and D1 may be prepared by controlling the conditions of the two reactors.

Loop reactors may be operated in either batch (closed-loop) or continuous configuration. A batch loop reactor may contain a vessel that is used to receive the initial charge of reactants and may also be employed for separation of a gaseous or solid product after the reaction. In some cases the energy of the recirculating stream can be used in the form of a jet to mix tank contents. A continuous loop reactor has feed streams, (e.g., at least two separate streams that include at least the first mixture and the second mixture, respectively), entering the loop (or tank, if present) and product streams leaving it. The rate of recirculation around the loop may be set independently of the throughput rate. This flexibility can be used to adapt the residence-time distribution of the overall reactor to requirements of the reaction. The higher the ratio of recirculating flow to through-flow, the nearer is the overall behavior of the loop reactor to ideal back mixing. Such adjustments are sometimes made between products in multiproduct reactors by altering pump speed or switching in more or less pipework.

Figure 2:
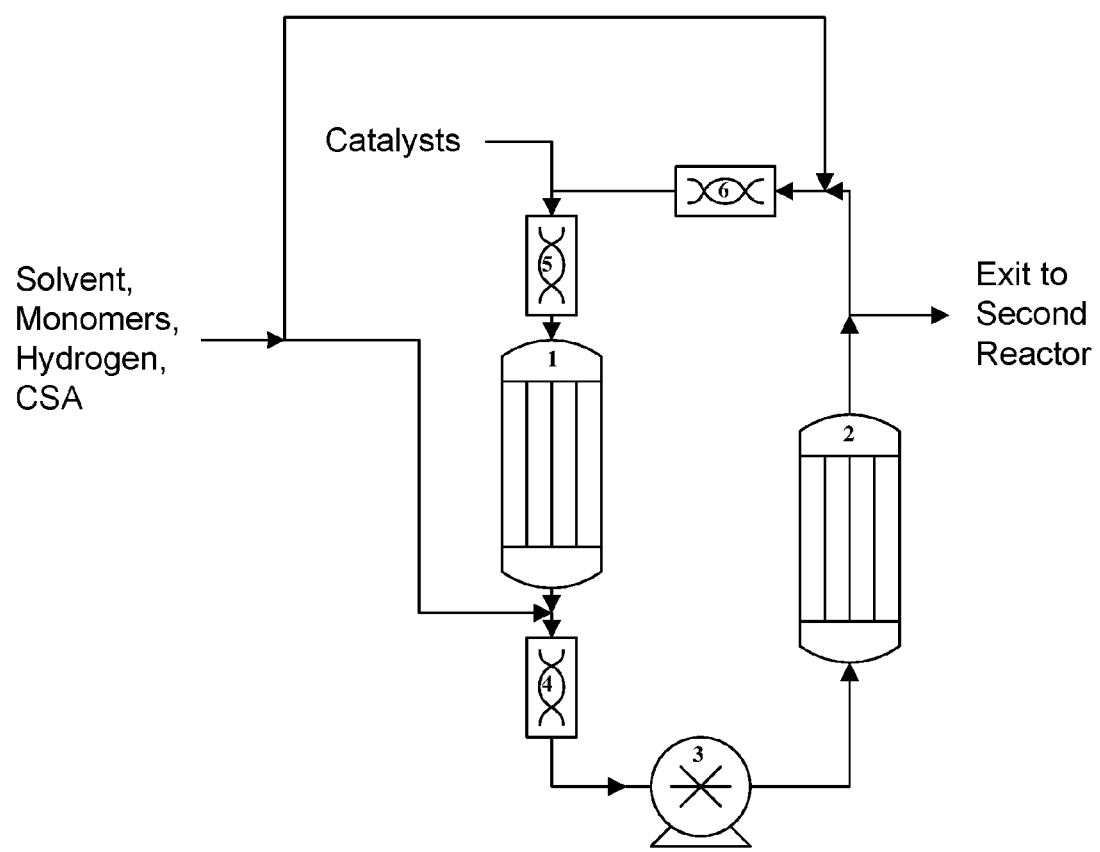
FIG. 2 illustrates an exemplary configuration of a continuous loop reactor that feeds into a second reactor, in which a chain shuttling agent is introduced into the loop reactor mixed with a high flow rate feed that includes solvent, monomers, and optionally hydrogen.

Loop reactors include one or more pumps, one or more heat exchangers, one or more feed injectors, and one or more mixing elements. These elements are connected in series and the reacting process fluid is pumped in a loop. Exemplary loop reactors are shown in FIGS. 1 and 2. FIG. 1 illustrates a related art exemplary continuous loop reactor configuration, in which a chain shuttling agent is part of a low flow rate catalyst feed. FIG. 1 is similar to the configuration discussed in U.S. Pat. No. 7,989,551 with respect to the figures and Examples 1 to 6, with the modification that instead of the first loop reactor feeding to a second reactor, the loop reactor outlet (referred to element 50 in U.S. Pat. No. 7,989,551) serves as a port for removal of the reactor contents and is in operative communication with a polymer recovery zone. Whereas in U.S. Pat. No. 7,989,551, after exiting the first reactor, the polymer may be separated from process solvent and unreacted monomers in the recovery zone. FIG. 2 illustrates an exemplary continuous loop reactor configuration, in which a chain shuttling agent is part of a high flow rate and optionally cooled feed that includes solvent, monomers, and the optional hydrogen.

Referring to FIGS. 1 and 2, heat exchanger 1 and heat exchanger 2 are illustrated as shell and tube heat exchangers. Shell and tube heat exchangers include a series of tubes. One set of these tubes contain a first fluid that is to be heated or cooled. A second fluid runs over the tubes that have the first fluid therein so that it can either provide the heat or absorb the heat. In exemplary embodiments, other types of heat exchangers may be used, e.g., a plate and shell heat exchanger, a plate heat exchanger, and/or a plate fin heat exchanger. Within the tubes, static mixers may be used to enhance heat transfer and/or improve mixing of the reacting mixture. The static mixers may improve mixing of the reaction fluid and/or increase heater transfer performance of the exchanger.

Referring to FIGS. 1 and 2, pump 3 is a circulating pump for the loop reactor. Exemplary pumps that may be used include positive displacement pumps (such as rotary positive displacement pumps, reciprocating positive displacement pumps, and screw pumps), and velocity pumps (such as centrifugal pumps, radial-flow pumps, axial-flow pumps, and mixed-flow pumps).

Referring to FIGS. 1 and 2, mixers 4, 5, and 6 are static mixers that disperse the bottom fresh feed, catalyst feed, and the top fresh feed, respectively, into the loop piping (which is donated by lines, as would be understood by one of ordinary skill in the art). The static mixers may use a plate type design to accomplish mixing through the use of intense turbulence in the flow. The static mixer elements may include a series of mixing elements (e.g., non-moving baffles) made of metal or a variety of plastics. Similarly, the static mixer housing may be made of metal. The static mixer may be designed to incorporate a method for delivering two streams of fluids therein. As the streams move through the static mixer, the mixing elements continuously blend the materials and produce patterns of flow division and radial mixing. Flow division refers to laminar flow, where a processed material divides at the leading edge of the mixing elements and follows the channels created by the shape of the mixing elements. With each subsequent mixing element, the channels are further divided, resulting in an exponential increase in stratification. Radial mixing refers to either turbulent flow or laminar flow, where rotational circulation of a processed material around its own hydraulic center in each channel of the mixer causes radial mixing of the material. Processed material is intermixed to reduce or eliminate radial gradients in temperature, velocity, and/or material composition.

The chain shuttling polymerization process may be carried out as liquid phase or gas phase polymerization. For example, in a stirred-tank reactor, the monomers to be polymerized may be introduced continuously together with any liquid phase solvent. As such, the reactor contains a liquid phase composed substantially of monomers together with the solvent and dissolved polymer.

Exemplary gas phase polymerization process for use herein are substantially similar to known processes used commercially on a large scale for the manufacture of polypropylene, ethylene/α-olefin copolymers, and other olefin polymers. The gas phase process employed can be, e.g., of the type that employs a mechanically stirred bed or a gas fluidized bed as the polymerization reaction zone. Examples include a process where the polymerization reaction is carried out in a vertical cylindrical polymerization reactor containing a fluidized bed of polymer particles supported or suspended above a perforated plate or fluidization grid, by a flow of fluidization gas.

The gas phase processes may utilize continuous processes that provide for the continuous supply of reactants to the reaction zone of the reactor and the removal of products from the reaction zone of the reactor, thereby providing a steady-state environment on the macro scale in the reaction zone of the reactor. Products may be readily recovered by exposure to reduced pressure and optionally elevated temperatures (devolatilization) according to known techniques. For example, the fluidized bed of the gas phase process is operated at temperatures greater than 50° C. (e.g., from 60° C. to 110° C. and/or from 70° C. to 110° C.).

Terms Regarding Block Copolymer and Block Composite

The chain shuttling polymerization may be utilized to form a block composite composition that includes a block copolymer. The relevant terms are discussed below.

"Composition" and like terms mean a mixture or blend of two or more components. For example, one composition is the combination of at least a thermoplastic polyolefin and a block interpolymer. Further, "blend", "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer thus embraces the term homopolymer, usually employed to refer to polymers prepared from only one type of monomer, and the term interpolymer. The term also encompasses all forms of interpolymers, e.g., random, block, homogeneous, heterogeneous, etc. Further, "interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Ethylene-based polymer" and the like terms mean a polymer that comprises a majority weight percent polymerized ethylene monomer (based on the total weight of polymerizable monomers), optionally may comprise at least one polymerized comonomer different from ethylene (such as at least one selected from a $C_{3-10}$ alpha-olefin), and optionally at least one hydrocarbon that includes at least one carbon double bond, so as to form an ethylene-based interpolymer. For example, when the ethylene-based polymer is a copolymer, the amount of ethylene is greater than 50 wt %, based on the total weight to the copolymer. When the ethylene-based polymer is an ethylene/comonomer/diene interpolymer, the amount of the ethylene is greater than the amount of the comonomer and the amount of the diene. "Units derived from ethylene" and like terms mean the units of a polymer that formed from the polymerization of ethylene.

"Propylene-based polymer," and like terms mean a polymer that comprises a majority weight percent polymerized propylene monomer (based on the total amount of polymerizable monomers), optionally comprises at least one polymerized comonomer different from propylene (such as at least one selected from ethylene and a $C_{4-10}$ alpha-olefin), and optionally at least one hydrocarbon that includes at least one carbon double bond, so as to form a propylene-based interpolymer. For example, when the propylene-based polymer is a copolymer, the amount of propylene is greater than 50 wt %, based on the total weight of the copolymer. "Units derived from propylene" and like terms mean the units of a polymer that formed from the polymerization of propylene monomers.

"Alpha-olefin-based polymer" and like terms mean a polymer that comprises a majority weight percent of a polymerized alpha-olefin monomer (based on the total amount of polymerizable monomers), optionally comprises at least one other polymerized alpha-olefin comonomer that is different from the polymerized alpha-olefin monomer, and optionally at least one hydrocarbon that includes at least one carbon double bond, so as to form an alpha-olefin-based interpolymer. By alpha-olefin monomer and comonomer it is meant one of a $C_{4-10}$ alpha-olefin. "Units derived from α-olefin" and like terms mean the units of a polymer that is formed from the polymerization of alpha-olefin monomers.

The term "block composite" (BC) refers to a composition comprising a first copolymer having a total comonomer content (one of a $C_{2-10}$ alpha-olefin) that is greater than 10 mol % and less than 95 mol %, a second polymer having a monomer content (another one of a $C_{2-10}$ alpha-olefin), and a block copolymer (e.g., a diblock having a first segment and a second segment). The first segment of the block copolymer is essentially the same composition as the first copolymer in the block composite and the second segment of the block copolymer is essentially the same composition as the second polymer of the block composite. The first copolymer is an ethylene-based polymer, a propylene-based polymer, or an alpha-olefin based polymer. The second polymer is an ethylene-based polymer, a propylene-based polymer, or an alpha-olefin based polymer. For example, the first copolymer may be an ethylene-propylene based copolymer and the second polymer may be polypropylene.

The block copolymer includes two or more blocks, e.g., may be a diblock copolymer with two blocks. In exemplary embodiments, the first copolymer and block may be "soft" segments/blocks that are amorphous, substantially amorphous, or elastomeric blocks of polymerized units. The second polymer and block may be "hard" segments/blocks that are crystalline blocks of polymerized units. Accordingly, in exemplary embodiments the block copolymer comprises two regions or segments of differentiated polymer composition or properties.

"Hard" segments refer to highly crystalline blocks of polymerized units in which the monomer is present in an amount greater than 90 mol %, greater than 93 mol %, greater than 95 mol %, and/or greater than 98 mol %. In other words, the total comonomer content in the hard segments is less than 2 mol %, less than 5 mol %, less than 7 mol %, and/or less than 10 mol %. In some embodiments, the hard segments comprise all or substantially all propylene units. For example, the hard segments may comprise isotactic polypropylene. "Soft" segments, on the other hand, refer to amorphous, substantially amorphous or elastomeric blocks of polymerized units in which the total comonomer content (such one of a $C_2$ and $C_{4-10}$ α-olefin and/or one of a diene) is greater than 10 mol % and less than 90 mol % (e.g., greater than 20 mol % and less than 80 mol % and/or greater than 33 mol % and less than 75 mol %). Block copolymers containing high crystallinity hard blocks are polymers that have hard blocks that have melting points greater than 100° C.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline". The term "crystallizable" refers to a monomer that can polymerize such that the resulting polymer is crystalline. Crystalline propylene polymers may have, but are not limited to, densities of 0.88 g/cc to 0.91 g/cc and melting points of 100° C. to 170° C. The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads. For example, a hard block/segment of the block copolymer may be isotactic polypropylene.

EXAMPLES

Working Example 1 and Comparative Example A are prepared using a first loop reactor followed by a second reactor configured in series, using the feed rates shown in Table 1, below. With respect to Working Example 1, the chain shuttling agent, which is diethylzinc (DEZ), is added in the higher flow rate feed stream that includes the Solvent, Propylene, and Ethylene (the optional Hydrogen is not feed to die first reactor). With respect to Comparative Example A, the chain shuttling agent is added in the lower flow rate stream that includes the Catalyst, Cocatalyst-1, and Cocatalyst-2.

Catalyst-1 ([[rel-2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl-hafnium). Cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., are purchased from Boulder Scientific and used without further purification. Cocatalyst-2 is modified methylalumoxane (MMAO) were purchased from Akzo Nobel and used without further purification. CSA is diethylzinc (DEZ) purchased from Akzo Nobel and used without further purification. The Solvent is the hydrocarbon mixture ISOPAR®E, obtainable from ExxonMobil Chemical Company, and purified through beds of 13-X molecular sieves prior to use.

First Reactor Conditions and Calculated Values with respect to feed rate ratios, ethylene content, and measured pressure drop increase for the Working Examples 1 to 3 and Comparative Example A are as follows:

TABLE 1

|  | Comparative Example A | Working Example 1 | Working Example 2 | Working Example 3 |
|---|---|---|---|---|
| Conditions (Measured Values) | | | | |
| Reactor Control Temp. (° C.) | 154 | 158 | 150 | 150 |
| Solvent Feed (lb/hr) | 330 | 363 | 437 | 401 |
| Propylene Feed (lb/hr) | 6.3 | 4.1 | 7.5 | 6.4 |
| Ethylene Feed (lb/hr) | 70.7 | 51.6 | 83.5 | 72.1 |
| Hydrogen Feed (SCCM) | 0 | 0 | 70 | 70 |
| CSA Flow (lb/hr) | 1.95 | 1.14 | 2.53 | 1.86 |
| CSA Concentration (ppm) | 49508 | 49994 | 37504 | 37504 |
| Reactor Exit Propylene Concentration (g/L) | 2.0 | 1.4 | 5.7 | 2.6 |
| Catalyst Flow (lb/hr) | 1.60 | 1.12 | 1.09 | 0.68 |
| Catalyst Concentration (ppm) | 284 | 275 | 250 | 250 |
| Cocatalyst-1 Flow (lb/hr) | 1.40 | 0.97 | 1.28 | 0.89 |
| Cocatalyst-1 Concentration (ppm) | 2996 | 2996 | 3997 | 3497 |
| Cocatalyst-2 Flow (lb/hr) | 2.05 | 1.21 | 0.81 | 1.51 |
| Cocatalyst-2 Concentration (ppm) | 995 | 1970 | 1995 | 995 |
| Calculated Values | | | | |
| Propylene/Ethylene Feed Ratio into the First Reactor (based on lb/hour) | 8.9 | 7.9 | 9.0 | 8.9 |
| Weight Percent Ethylene in Polymer by Mass Balance (polymer exiting first reactor) | 93.3 | 94.3 | 97.2 | 94.3 |
| Rate of Increase in Pressure Drop in the First Reactor (psi/day) | 17.10 | 1.11 | 0.24 | 0.67 |

Referring to Table 1, it can be seen for both Comparative Example A and Working Example 1, an overall concentration in ppm of the CSA are similar. However, as discussed below, a significant difference is realized with respect to the processes. Further, referring to Table 1, it can be seen that for Comparative Example A and for Working Examples 1 to 3, at a weight percent ethylene ranging from 93 wt % to 98 wt % for a polymer product in a first reactor, a significantly higher pressure drop increase per day is observed for Comparative Example A relative to Working Examples 1 to 3. For example, the average pressure drop per day is increased by at least 15 times when the CSA is added with catalysts instead of with solvent and monomers. For example, by adding the a chain shuttling agent, a solvent, and the one or more $C_2$ to $C_{10}$ alpha olefin polymerizable monomers (e.g., ethylene and one or two $C_3$ to $C_{10}$ alpha olefins and/or ethylene and propylene) together as one feed to the first reactor, the average pressure drop increase per day may be decreased by at least 15 times relative to adding the chain shuttling agent, the catalyst, the cocatalyst-1, and the cocatalyst-2 together as one feed to the first reactor. This may be realized for products having a similar ethylene content (±10 wt % ethylene) for the polymers existing the first reactor.

Figure 3A:
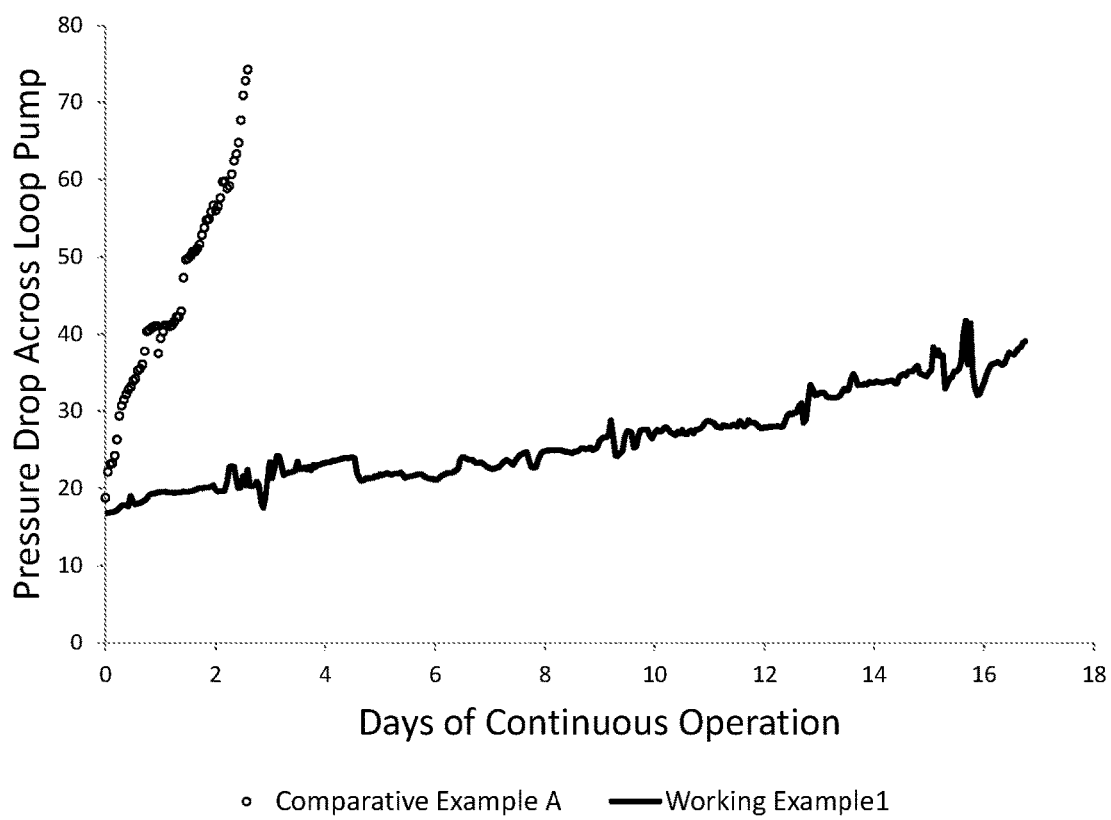
FIG. 3A illustrates a graphical representation of measured pressure drop (in psig) over a period of up to 18 days across a loop pump for Working Example 1 and Comparative Example A.
Figure 3B:
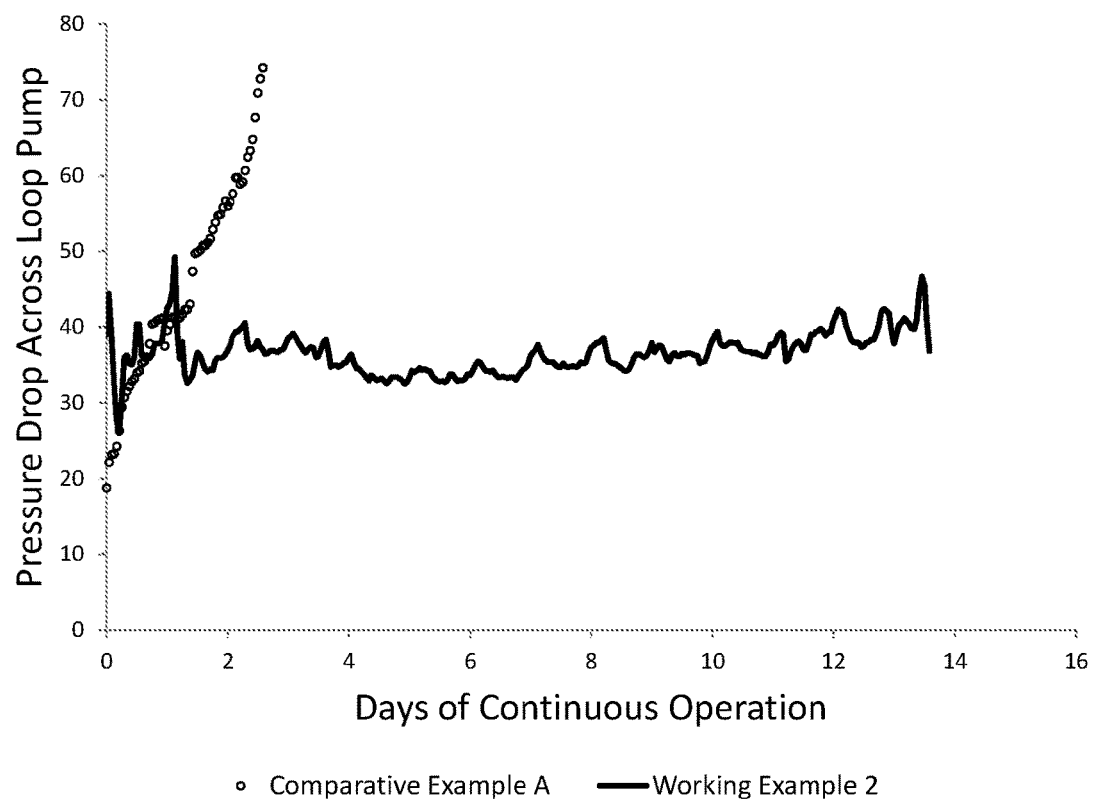
FIG. 3B illustrates a graphical representation of measured pressure drop (in psig) over a period of up to 18 days across a loop pump for Working Example 2 and Comparative Example A.
Figure 3C:
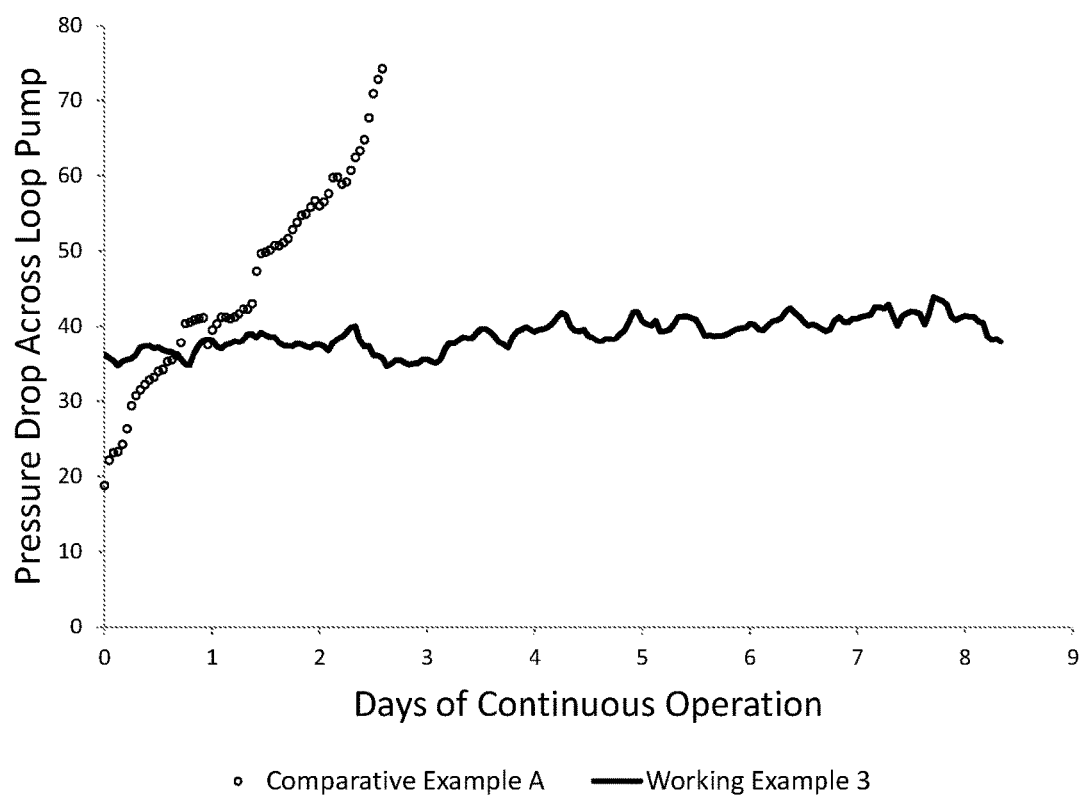
FIG. 3C illustrates a graphical representation of measured pressure drop (in psig) over a period of up to 18 days across a loop pump for Working Example 3 and Comparative Example A.
Figure 4A:
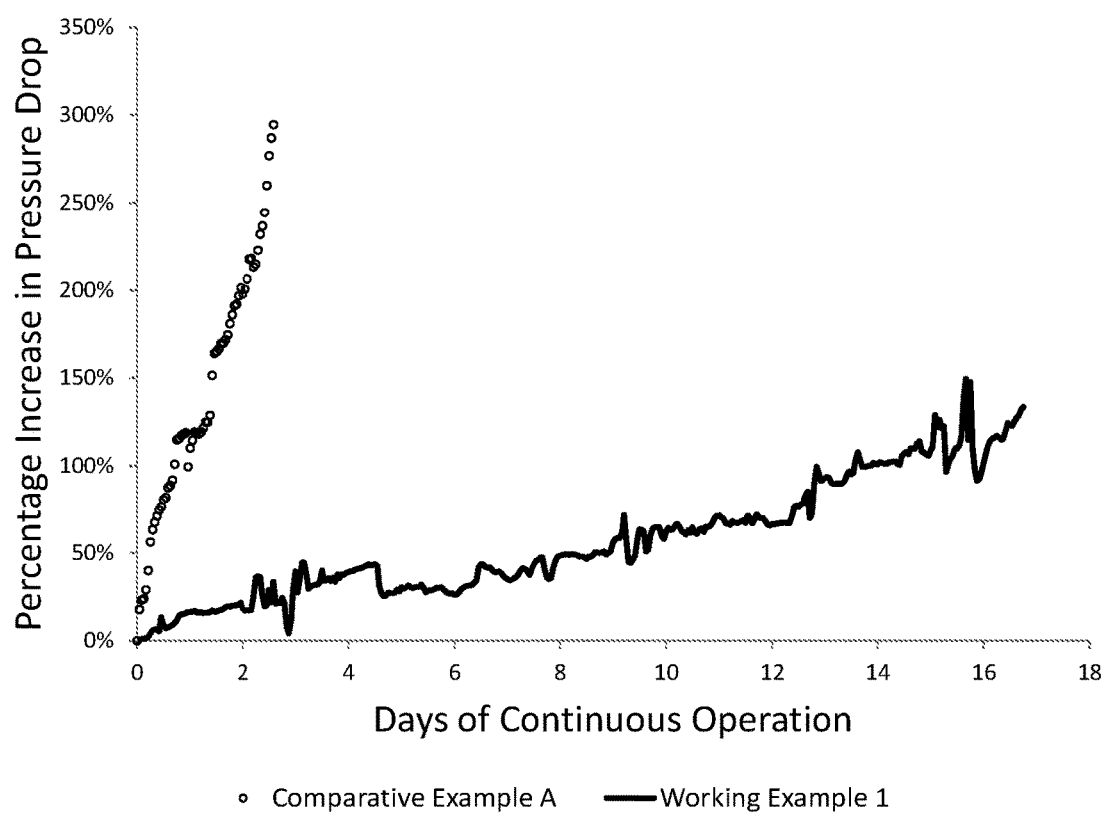
FIG. 4A illustrates a graphical representation of measured percentage increase in pressure drop over a period of up to 17 days across a loop pump for Working Example 1 and Comparative Example A.
Figure 4B:
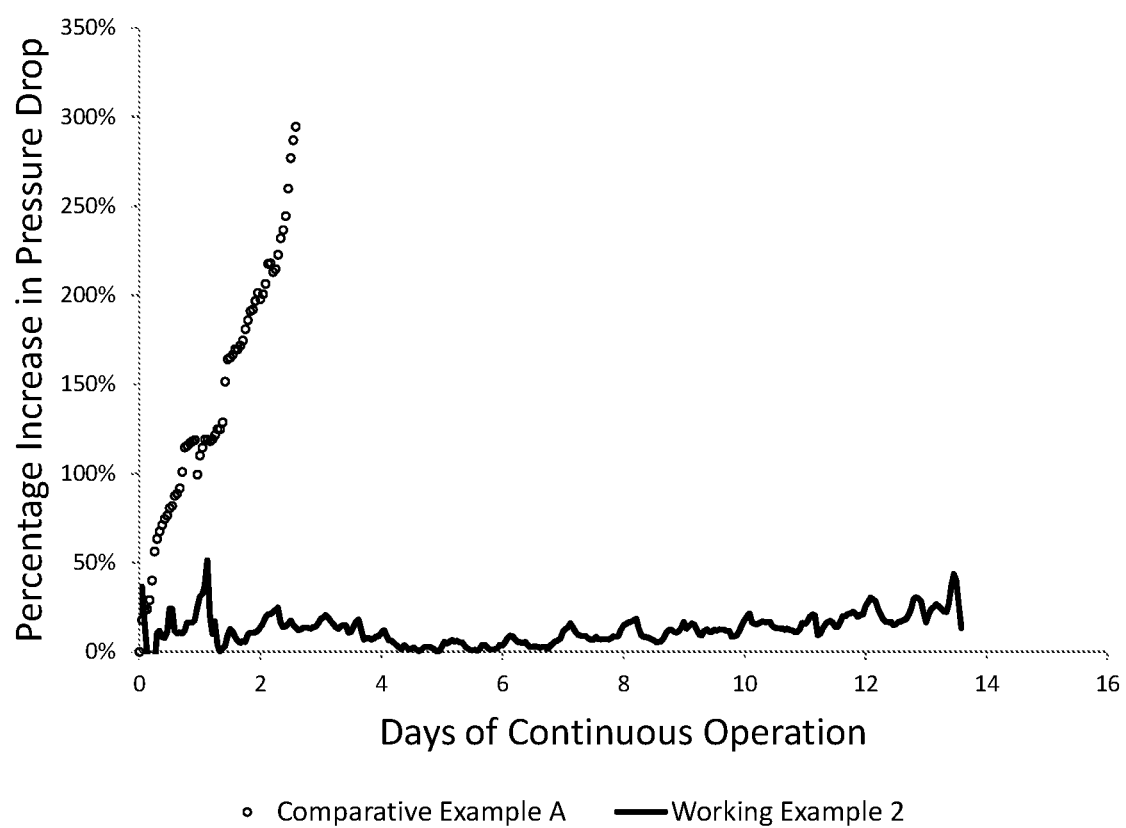
FIG. 4B illustrates a graphical representation of measured percentage increase in pressure drop over a period of up to 17 days across a loop pump for Working Example 2 and Comparative Example A.
Figure 4C:
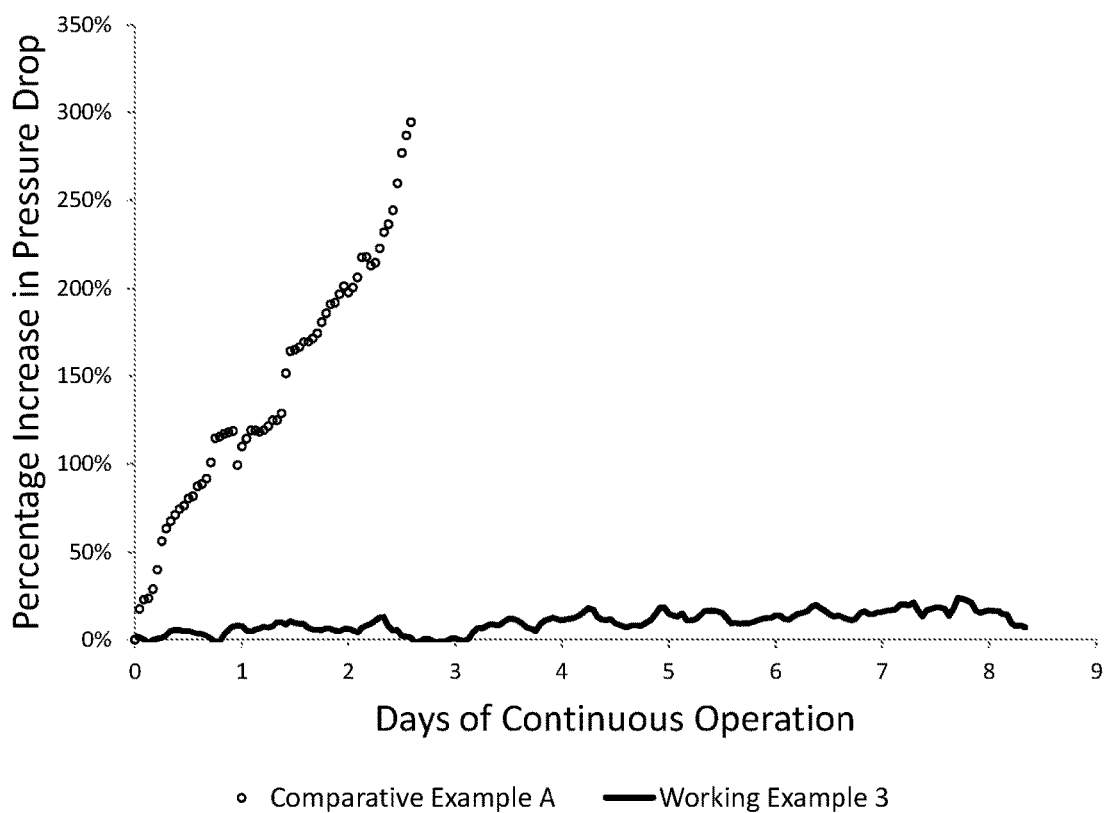
FIG. 4C illustrates a graphical representation of measured percentage increase in pressure drop over a period of up to 17 days across a loop pump for Working Example 3 and Comparative Example A.
Figure 5:
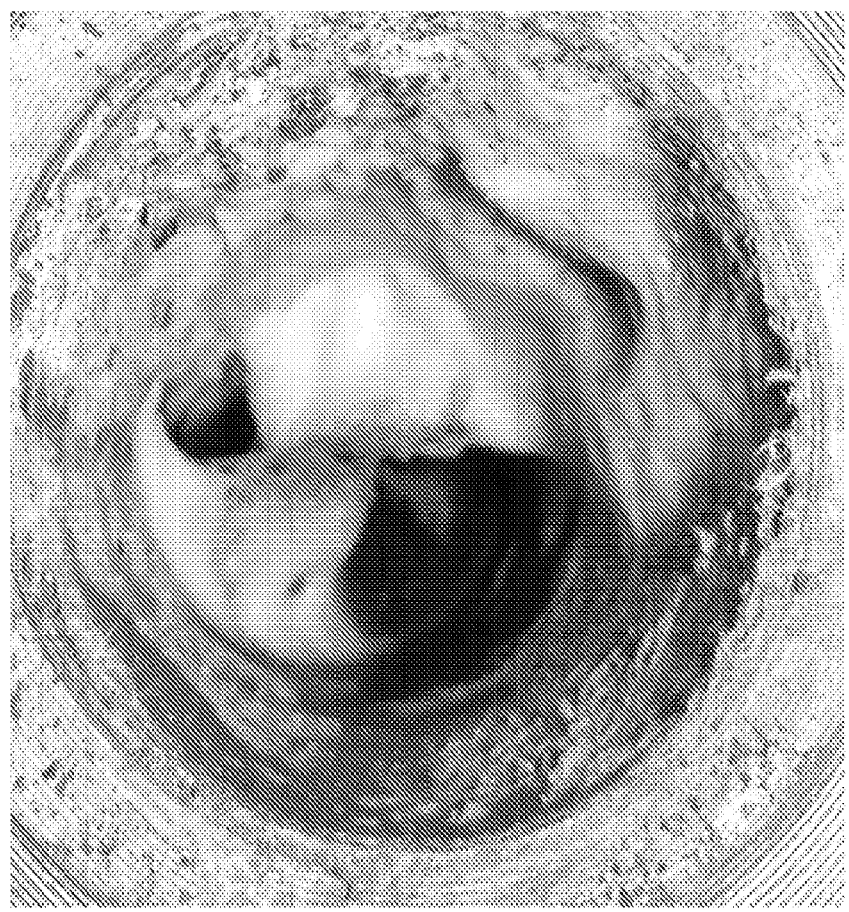
FIG. 5 illustrates the clogging of a static mixer in Comparative Example A, after a period of 48 hours of operation.
Figure 6:
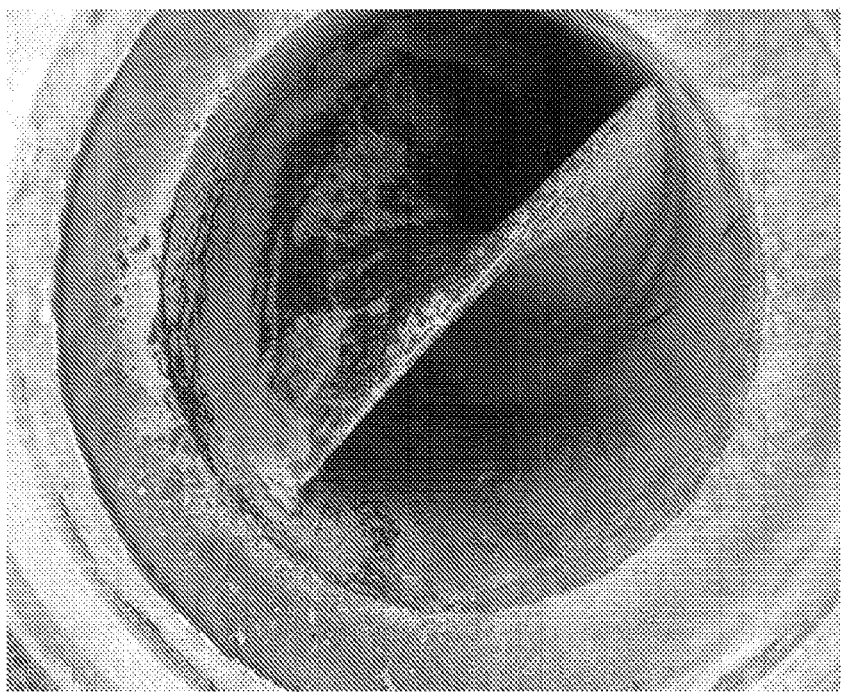
FIG. 6 illustrates the relatively free flowing static mixer in Working Example 1, after a period of 17 days of operation.

To evaluate the processes, pressure drop (in psi) across a recirculation pump of the first loop reactor is observed for Working Examples 1 to 3 and Comparative Example A for a period of 17 days of continuous operation. The pressure drop increase is recorded as change in pressure in psi per day (24 hour period), as such the noted pressure drop increase is an average over the period of 17 days of continuous operation. Whereas, at a pressure drop of at least 80 psi, it is assumed that a significant amount of reactor fouling has occurred in the specific equipment used for these two examples and that the system should be shutdown for cleaning. Referring to FIG. 3, it is shown that a lower pressure drop and a significantly lower increase in pressure drop across the pump is realized for Working Examples 1 to 3 in comparison to Comparative Example A. Referring to FIG. 4, it is also shown that a significantly lower percentage in increase in pressure drop is realized for Working Examples 1 to 3 in comparison to Comparative Example A. Further, as shown in FIGS. 5 and 6, it is clear that the amount of fouling observed for a static mixer within the loop reactor is significantly greater with respect to Comparative Example A (as shown in FIG. 5) in comparison to Working Example 1 (as shown in FIG. 6).

What is claimed is:

1. A process for the polymerization of one or more polymerizable $C_2$ to $C_{10}$ alpha-olefin monomers to form a block copolymer comprising two or more regions or segments of differentiated polymer composition or properties, the process comprising:
   (A) feeding a first mixture that includes a chain shuttling agent, a solvent, the one or more $C_2$ to $C_{10}$ alpha-olefin polymerizable monomers, and optionally hydrogen into a first reactor or reactor zone;
   (B) feeding a second mixture that includes at least one olefin polymerization catalyst and at least one cocatalyst into the first reactor or reactor zone, the second mixture being separate from the first mixture prior to entering the first reactor or reactor zone;
   (C) contacting the first mixture and the second mixture under polymerization conditions in the first reactor or reactor zone to form a reaction mixture that is characterized by the formation of polymer chains from the one or more polymerizable $C_2$ to $C_{10}$ alpha-olefin monomers;
   (D) optionally providing the reaction mixture to a second reactor or reactor zone and optionally adding one or more additional solvents, polymerizable $C_2$ to $C_{10}$ alpha-olefin monomers, and/or catalysts; and
   (E) allowing polymerization to occur in at least one of the first reactor or reactor zone and the second reactor or reactor zone to form polymer chains that are differentiated from the polymer chains formed in (C), such that the resultant polymer molecules comprise two or more chemically or physically distinguishable blocks,
   wherein the first mixture has a flow rate in pounds per hour into the first reactor or reactor zone that is from 95 times to 1,000,000 times greater than the flow rate in pounds per hour of the second mixture into the first reactor or reactor zone.

2. The process as claimed in claim 1, wherein the process is characterized by addition of the chain shuttling agent only to the reaction mixture prior to (C) within the first mixture and excluded from the second mixture.

3. The process as claimed in claim 1, wherein the first mixture is cooler than a temperature in the first reactor or reactor zone when entering the first reactor or reactor zone.

4. The process as claimed in claim 1, wherein the chain shuttling agent is a trihydrocarbyl aluminum- or dihydrocarbyl zinc- compound containing from 1 to 12 carbons in each hydrocarbyl group.

5. The process as claimed in claim 1, wherein the one or more polymerizable monomers includes propylene and ethylene, which are fed into the first reactor or reactor zone with the chain shuttling agent in (A).

6. The process as claimed in claim 5, wherein additional propylene and ethylene are added in (D), which are fed into the second reactor or reactor zone without the chain shuttling agent in (D).

7. The process as claimed in claim 1, wherein a block composite is formed in the second reactor or reactor zone, the block composite including a first $C_2$ to $C_{10}$ alpha-olefin based polymer, a second $C_2$ to $C_{10}$ alpha-olefin based polymer different from the first $C_2$ to $C_{10}$ alpha-olefin based polymer, and the block copolymer that includes a first segment that is essentially the same composition as the first $C_2$ to $C_{10}$ alpha-olefin based polymer and a second segment that is essentially the same composition as the second $C_2$ to $C_{10}$ alpha-olefin based polymer.

8. The process as claimed in claim 1, wherein:

the first reactor or reactor zone is a first reactor zone and the second reactor or reactor zone is a second reactor zone, and the first mixture is fed into the first reactor zone or both the first and second reactor zones, in series or parallel, and polymerization is allowed to occur in the either the first reactor zone, or either the first and second reactor zones in parallel.

* * * * *